United States Patent
Wolfensparger et al.

(10) Patent No.: US 11,206,365 B2
(45) Date of Patent: Dec. 21, 2021

(54) METHOD AND APPARATUS FOR OVERLAYING THEMED IMAGERY ONTO REAL-WORLD OBJECTS IN A HEAD-MOUNTED DISPLAY DEVICE

(71) Applicant: Charter Communications Operating, LLC, St. Louis, MO (US)

(72) Inventors: Dell Wolfensparger, Langley, WA (US); Andrew Ip, Centennial, CO (US); Dhananjay Lal, Englewood, CO (US); Matthew Ringenberg, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/741,297

(22) Filed: Jan. 13, 2020

(65) Prior Publication Data

US 2021/0218905 A1    Jul. 15, 2021

(51) Int. Cl.
| | |
|---|---|
| *H04N 5/272* | (2006.01) |
| *G06K 9/00* | (2006.01) |
| *G06T 11/00* | (2006.01) |
| *G06T 7/70* | (2017.01) |
| *G06T 7/50* | (2017.01) |

(52) U.S. Cl.
CPC ......... *H04N 5/272* (2013.01); *G06K 9/00664* (2013.01); *G06K 9/00718* (2013.01); *G06T 7/50* (2017.01); *G06T 7/70* (2017.01); *G06T 11/001* (2013.01); *G06K 2209/27* (2013.01)

(58) Field of Classification Search
CPC . H04N 5/272; G06T 7/50; G06T 7/70; G06K 9/00664
See application file for complete search history.

(56) References Cited

U.S. PATENT DOCUMENTS

| | | | | |
|---|---|---|---|---|
| 5,714,997 A | * | 2/1998 | Anderson | G02B 27/017 348/39 |
| 9,214,038 B1 | * | 12/2015 | Urbach | H04N 21/816 |
| 2007/0162855 A1 | * | 7/2007 | Hawk | G11B 27/034 715/730 |
| 2009/0327927 A1 | * | 12/2009 | De Leon | G06F 1/1626 715/763 |

(Continued)

*Primary Examiner* — Sarah Lhymn
(74) *Attorney, Agent, or Firm* — Withrow & Terranova, PLLC

(57) ABSTRACT

Method and apparatus for overlaying themed imagery onto real-world objects in a head-mounted display device (HMDD). A computing device receives, from an HMDD, depth data that identifies distances from the HMDD to surfaces of a plurality of objects in a user space. The computing device detects at least one object in the user space based at least in part on the depth data. The computing device determines a classification of video content being presented on a display system of the HMDD. The computing device selects, based on the classification, a particular image theme from a plurality of different image themes, the image theme comprising one or more image textures. The computing device sends, to the HMDD, at least one image texture for overlaying the at least one object during presentation of the at least one object on the display system of the HMDD in conjunction with the video content.

18 Claims, 11 Drawing Sheets

(56) References Cited

U.S. PATENT DOCUMENTS

| | | | |
|---|---|---|---|
| 2012/0229508 A1* | 9/2012 | Wigdor | H04N 5/262 345/633 |
| 2016/0132199 A1* | 5/2016 | Wilburn | H04L 41/22 715/745 |
| 2016/0188585 A1* | 6/2016 | Durham | G06F 3/011 345/633 |
| 2016/0217590 A1* | 7/2016 | Mullins | G06T 7/40 |
| 2018/0146212 A1* | 5/2018 | Hensler | G06T 5/50 |
| 2018/0199039 A1* | 7/2018 | Trepte | G06T 15/405 |
| 2019/0197768 A1* | 6/2019 | Taylor | G06T 17/00 |
| 2019/0220002 A1* | 7/2019 | Huang | G06T 7/70 |
| 2020/0023157 A1* | 1/2020 | Lewis | H04N 5/272 |
| 2020/0035040 A1* | 1/2020 | Eschricht | G06F 3/011 |

* cited by examiner

METHOD AND APPARATUS FOR OVERLAYING THEMED IMAGERY ONTO REAL-WORLD OBJECTS IN A HEAD-MOUNTED DISPLAY DEVICE

BACKGROUND

Virtual reality and augmented reality head-mounted display devices may be used to watch streaming video content, such as movies, sports events, and the like.

SUMMARY

The embodiments disclosed herein include methods and apparatus for overlaying themed imagery onto real-world objects in a head-mounted display device (HMDD). The embodiments provide a themed environment in a user space, such as, by way of non-limiting example, a bed room or a family room, in which the user is presented with streamed video content. As the user moves their head about the user space, real-world objects are overlaid with themed imagery based, at least in part, on the streamed video content. The structure of the real-world objects does not change, and thus the user can safely move about the room.

In one embodiment a method is provided. The method includes receiving, by a computing device from an HMDD, depth data that identifies distances from the HMDD to surfaces of a plurality of objects in a user space. The method further includes detecting at least one object in the user space based at least in part on the depth data. The method further includes determining, by the computing device, a classification of video content being presented on a display system of the HMDD. The method further includes selecting, based on the classification, a particular image theme from a plurality of different image themes, the image theme comprising one or more image textures, and sending, to the HMDD, at least one image texture for overlaying the at least one object during presentation of the at least one object on the display system of the HMDD in conjunction with the video content.

In another embodiment a computing device is provided. The computing device includes a memory, and a processor device coupled to the memory configured to receive, from an HMDD, depth data that identifies distances from the HMDD to surfaces of a plurality of objects in a user space. The processor device is further configured to detect at least one object in the user space based at least in part on the depth data. The processor device is further configured to determine a classification of video content being presented on a display system of the HMDD. The processor device is further configured to select, based on the classification, a particular image theme from a plurality of different image themes, the image theme comprising one or more image textures. The processor device is further configured to send, to the HMDD, at least one image texture for overlaying the at least one object during presentation of the at least one object on the display system of the HMDD in conjunction with the video content.

In another embodiment a computer program product is provided. The computer program product is stored on a non-transitory computer-readable storage medium and includes instructions configured to cause a processor device to receive, from an HMDD, depth data that identifies distances from the HMDD to surfaces of a plurality of objects in a user space. The instructions are further configured to cause the processor device to detect at least one object in the user space based at least in part on the depth data. The instructions are further configured to cause the processor device to determine a classification of video content being presented on a display system of the HMDD. The instructions are further configured to cause the processor device to select, based on the classification, a particular image theme from a plurality of different image themes, the image theme comprising one or more image textures. The instructions are further configured to cause the processor device to send, to the HMDD, at least one image texture for overlaying the at least one object during presentation of the at least one object on the display system of the HMDD in conjunction with the video content.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Virtual reality (VR) and augmented reality (AR) head-mounted display devices (hereinafter "HMDDs") may be used to watch streaming video content, such as movies, sports events, and the like. Typically, the streaming video content takes up a large portion of the field of view (FOV) of the HMDD, but not the entire FOV. Depending on the type of HMDD, the portion of the FOV of the HMDD outside of the streaming video content may be replaced with a black or dark background. In an augmented reality HMDD, real-world objects may be viewed in the portion of the FOV of the HMDD outside of the streaming video content.

The embodiments disclosed herein include methods and apparatus for overlaying themed imagery onto real-world objects in an HMDD. The embodiments provide a themed environment in a user space, such as, by way of non-limiting example, a bed room or a family room, in which the user is presented with streamed video content. As the user moves their head about the user space, real-world objects are overlaid with themed imagery based, at least in part, on the streamed video content. The structure of the real-world objects does not change, and thus the user can safely move about the room. The embodiments enhance the viewing environment in which the user is enjoying the streaming video content by enhancing the viewing environment to have a theme related to the streaming video content.

Figure 1:
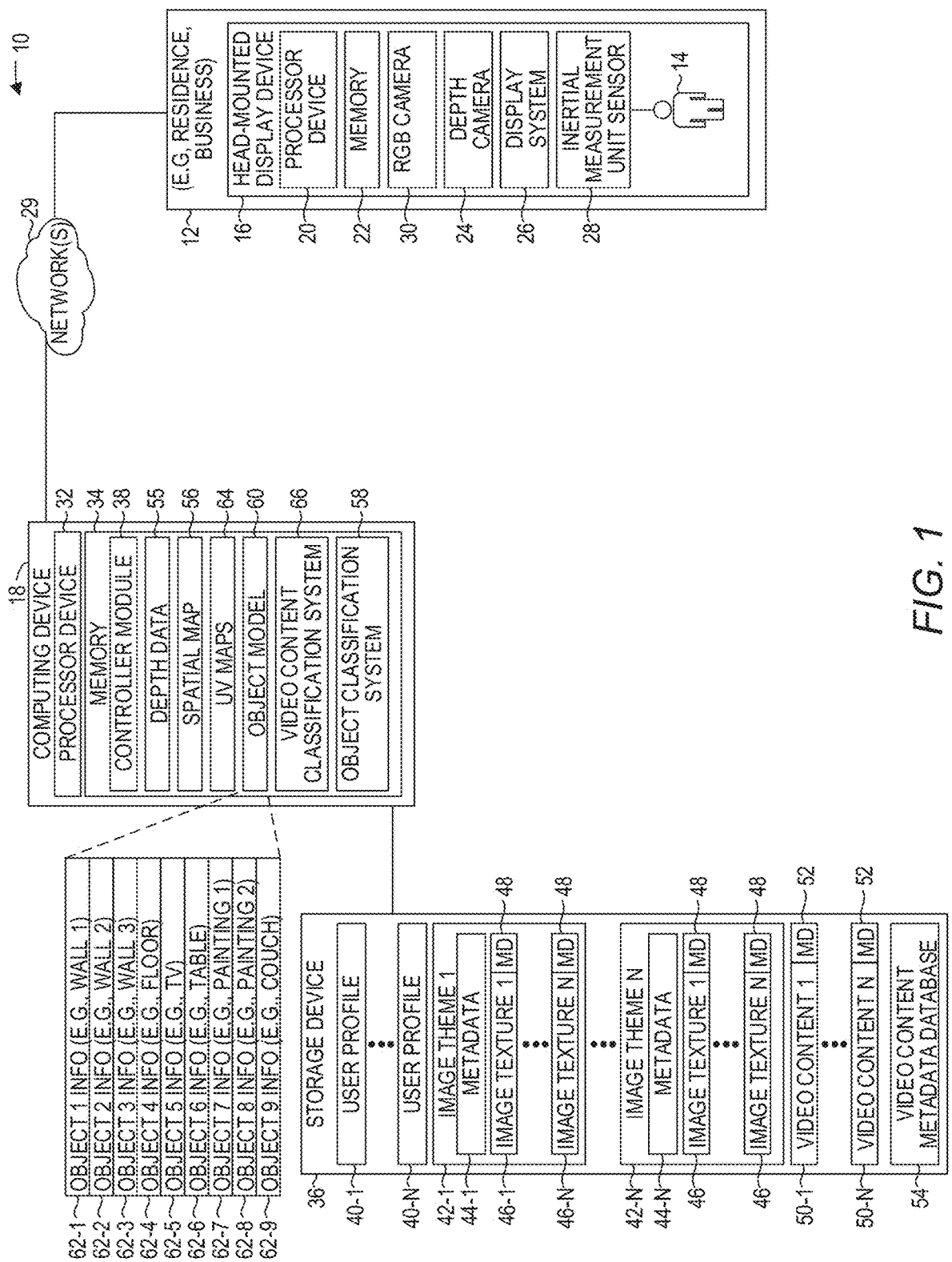
FIG. 1 is a block diagram of an environment that may be utilized to overlay themed imagery onto real-world objects in a head-mounted display device (HMDD) according to one embodiment.

FIG. 1 is a block diagram of an environment 10 that may be utilized to overlay themed imagery onto real-world objects in an HMDD according to one embodiment. The environment 10 includes a user space 12 in which a user 14 is viewing streaming video content via an HMDD 16. The user space 12 is a volume such as a family room, a business office, a bedroom, or the like, in which one or more objects exist. The term "object" as used herein refers to an item that has at least one surface. By way of non-limiting example, an object may be a wall, a ceiling, a floor, a table, a chair, a sofa, a painting, a bookcase, a desk, or the like. The HMDD 16 may comprise an optical see-through augmented reality (AR) HMDD, a video see-through HMDD, or a virtual reality (VR) HMDD.

The streaming video content being viewed by the user 14 may be streaming on a device in the user space 12, such as on a television, or may be streaming video content that is sent directly to the HMDD 16 by another device, such as a computing device 18. The term "streaming" in the context of streaming video content means that the video content changes over time, as opposed to a still image. The streaming video content may be live content, such as a live sporting event, or may be recorded content, such as a movie, a TV show, or the like.

The HMDD 16 includes a processor device 20, a memory 22, a depth camera 24, a display system 26, and an inertial measurement unit sensor (IMU) 28. The HMDD 16 may also include an RGB camera 30. The HMDD 16 is configured to be coupled to a head of the user 14, such as via a frame similar to glasses, or via straps, a helmet, a cap, or the like.

The depth camera 24 generates depth data that identifies distances from the HMDD 16 to surfaces of objects in the user space 12. The depth camera can comprise any suitable depth camera, such as an Intel® D435 depth camera, or the like. As will be described in greater detail below, the depth data generated by the depth camera 24 can be used to generate a spatial map of the user space 12, and based on the spatial map, objects in the user space 12 can be classified and identified.

The display system 26 differs depending on a type of the HMDD 16. In an AR HMDD 16, the display system 26 presents real-world objects that are within a field of view (FOV) of the HMDD 16 to the user 14, and, as discussed in greater detail below, presents themed imagery that overlays certain real-world objects. Any suitable AR or VR display system technology may be utilized in the present embodiments. In a VR HMDD 16, the display system 26 generally comprises an active display, such as a Liquid Crystal on Silicon (LCOS) display, a Light-Emitting Diode (LED) display, an Organic Light-Emitting Diode (OLED) display, or the like, on which imagery is presented.

The IMU 28 generates roll, yaw and pitch data via which the processor device 20 can determine in which direction the HMDD 16 is oriented, and thus what real-world objects are within the FOV of the HMDD 16.

The computing device 18 includes a processor device 32 and a memory 34. The computing device 18 includes, or is communicatively coupled to a storage device 36. The memory 34 includes a controller module 38 that implements certain of the functionality disclosed herein. In some embodiments, the computing device 18 may be controlled by a service provider that provides services to the user 14. The storage device 36 may include one or more user profiles 40-1-40-N, each of which may correspond to a different subscriber of the service provider. Each user profile 40-1-40-N may identify preferences of the corresponding subscriber, including, by way of non-limiting example, sports team preferences, movie genre preferences, and the like. The computing device 18 may be communicatively coupled to the HMDD 16 via one or more networks 29. In some embodiments, the network 29 may comprise a local area network, and the computing device 18 may be geographically close to the HMDD 16, such as in the same house or user space. In other embodiments, the computing device 18 may be, for example, operated by a service provider from whom the user 14 obtains services. In such embodiments, the computing device 18 may be geographically remote from the user 14, and the network 29 may comprise a number of switch devices between the computing device 18 and the HMDD 16.

It is noted that, because the controller module 38 is a component of the computing device 18, functionality implemented by the controller module 38 may be attributed to the computing device 18 generally. Moreover, in examples where the controller module 38 comprises software instructions that program the processor device 32 to carry out functionality discussed herein, functionality implemented by the controller module 38 may be attributed herein to the processor device 32.

The storage device 36 includes a plurality of image themes 42-1-42-N (generally, image themes 42). The image themes 42 each have a particular theme, such as baseball, football, science fiction, comedy, summer, winter, or the like. Some of the image themes 42 may be specific to particular video content, such as the movie Star Wars, or to particular sports video content, such as sports video content featuring a particular sports team, such as the Baltimore Ravens. Some of the image themes 42 may pertain to genres of video content, such as video content associated with a particular content producer, such as Disney® or video content associated with cooking, automobile racing, or horror movies.

The image themes 42-1-42-N have corresponding metadata 44-1-44-N that includes tags that describe what the image theme 42 pertains to. The tags may be textual descriptors, such as "sports", "baseball", "Cincinnati Reds", "winter", "summer", or the like. The image themes 42 include one or more image textures 46, each of which is an image (i.e., image data) that depicts something related to the particular image theme 42 to which the image texture 46 belongs. As an example, the image theme 42-1 includes a plurality of image textures 46-1-46-N (image textures 46). Each image texture 46 is an image that relates to the image theme 42-1. For example, if the image theme 42-1 relates to baseball, the image texture 46-1 may depict a baseball and the image texture 46-N may depict a baseball bat. If the image theme 42-1 relates to a specific baseball team, the image texture 46-1 may depict a baseball with the logo of the specific team, and the image texture 46-N may depict a team mascot. Other image textures 46 of the image theme 42-1 may depict the primary colors used by the baseball team. If the image theme 42-1 relates to winter, the image texture 46-1 may depict a snow-covered road, and the image texture 46-N may depict a snowman.

As will be described in greater detail below, objects that are identified in the user space 12 may be overlaid with the image textures 46 and presented to the user 14 via the display system 26 in lieu of the real-world object. The image textures 46 may have corresponding metadata 48 that may be used by the controller module 38 in association with certain objects. For example, the metadata 48 of the image texture 46-1 may indicate that the image texture 46-1 is particularly well-suited for overlaying a relatively planar object, such as a surface of a wall or a surface of a table. The metadata 48 of the image texture 46-N may indicate that the image texture 46-N is particularly well-suited for a spherical object, such as a globe, a vase, or the like.

The storage device 36 may also include a plurality of recorded video contents 50-1-50-N that may be selected by the user 14 for streaming to the HMDD 16. The video contents 50 include metadata 52 that contains a classification that can be used by the controller module 38 to select a particular image theme 42 for use in conjunction with the corresponding video content 50. The storage device 36 may also include a video content metadata database 54 that contains, for thousands or millions of different video contents, metadata that may be used by the controller module 38 to select a particular image theme 42 for use in conjunction with a particular video content being watched by the user 14.

To illustrate overlaying themed imagery onto real-world objects in the HMDD 16 according to one embodiment, assume that the user 14 desires to watch streaming video content. In a first embodiment, assume that the user 14 selects the video content 50-1 for viewing on the HMDD 16. The computing device 18 may send a message to the HMDD 16 asking whether the user 14 desires to have themed imagery overlay real-world objects in the user space 12. The depth camera 24 begins generating depth data 55 that identifies distances from the HMDD 16 to surface of objects in the user space 12. The computing device 18 may send one or more messages to the HMDD 16 requesting that the user 14 follow a particular protocol, such as slowly scanning the user space 12 in a 360 degree circle.

The computing device 18 receives the depth data 55 and generates a spatial map 56. The spatial map 56 comprises thousands of pixels with each pixel corresponding to a particular location in the user space 12, and identifying a distance between the HMDD 16 and the particular location. The computing device 18 utilizes an object classification system 58 to analyze the spatial map 56 and generate an object model 60. The object classification system 58 is, in some embodiments, a machine learning algorithm, such as a neural network, that has been trained to classify and identify objects depicted in a spatial map. In some embodiments, as the user 14 scans the user space 12, the RGB camera 30 also generates color imagery of the user space 12, which may also be provided to the computing device 18. The object classification system 58 may also utilize such imagery for purposes of classification and identification of objects in the user space 12.

The object classification system 58 generates object information for each object classified and identified in the user space 12. In this example, the object classification system 58 generates object information 62-1-62-9 (generally, object information 62). Each object information 62 identifies a location of a corresponding object in the user space 12, and geometric data, such as a mesh, that defines a structure of the corresponding object.

The controller module 38 then selects a particular image theme 42, such as the image theme 42-1 for example, based on the classification identified in the metadata 52 of the video content 50-1. The controller module 38 may then generate a plurality of UV maps 64, each of which maps a particular image texture 46 of the image theme 42 onto a corresponding object identified in the object model 60. The controller module 38 then sends the UV maps 64, the image textures 46, and the object information 62-1-62-9 to the HMDD 16. The HMDD 16 receives the UV maps 64, the image textures 46, and the object information 62-1-62-9. The HMDD 16 may then begin streaming the video content 50-1 to the display system 26, or may have already been streaming the video content 50-1 to the display system 26. The video content 50-1 is streamed to an area of the display system 26. However, the area of the display system 26 to which the video content is streamed does not completely encompass the FOV of the HMDD 16. The HMDD 16 periodically determines, such as 30 or 60 times a second (or at any other desired periodic basis), based on the object information 62-1-62-9, which objects or parts of objects are currently within the FOV of the HMDD 16, but are not blocked by the streaming video content 50-1. The HMDD 16 then renders imagery of those objects based on the UV maps 64, the image textures 46, and the object information 62-1-62-9, and presents the rendered imagery in conjunction with the video content 50-1. The rendered imagery essentially depicts the real-world objects in the precise location and precise structure but "wrapped" in themed imagery.

It is noted that in some embodiments the HMDD 16 may keep track of whether the particular user space 12 has been previously scanned by the depth camera 24 and whether the HMDD 16 already has the UV maps 64, the image textures 46, and the object information 62-1-62-9 from a previous session. If so, the HMDD 16 may then rescan the user space 12 and determine if any changes have occurred in the user space 12, such as whether any objects are in a different location, new objects have been added to the user space 12, or objects have been removed from the user space 12. The HMDD 16 may communicate only those changes to the controller module 38. The controller module 38 compares the changes to the previous object model 60, changes the object model 60 as appropriate, and sends to the HMDD 16 new or updated UV maps 64, image textures 46, and object information 62 as appropriate based on the revisions. In this manner fixed structures, such as walls, the ceiling and the floor of the user space 12 need not be reprocessed for each session of the HMDD 16.

The user 14 views both the video content 50-1 and those objects in the user space 12 that are within the FOV of the HMDD 16 but are not blocked by the video content 50-1. The objects in the user space 12, such as walls, the ceiling, the floor, a table, a couch, or the like, are presented in the correct location and having the correct geometric structure, but are depicted with image textures 46 of the image theme 42-1 in lieu of the actual real-world appearance of the objects. For example, a table top will be shown in the correct location and as having the correct geometric shape as the real-world table, but will be depicted with a baseball-themed image, or the like. As the user 14 moves their head to encompass different parts of the user space 12, each object that comes within the FOV of the HMDD 16 is depicted in the display system 26 with such themed imagery. The user 14 is thus presented with an environment that corresponds precisely to the location and shape of the real-world objects in the user space 12, but which is entirely different in terms of external appearance in that each object is now "wrapped" in imagery that compliments the video content 50-1.

As will be discussed in conjunction with FIGS. 2A-2D, in some embodiments the user 14 may use the HMDD 16 to view video content that is streaming on a device in the user space 12, such as a television (TV). In such embodiments, the HMDD 16 may provide a portion of the video content to the computing device 18 for classification. The controller module 38 uses a video content classification system 66 to analyze the portion of video content and classify the video content to thereby allow the controller module 38 to select an appropriate image theme 42. In some embodiments, the video content classification system 66 generates audio and/or video fingerprints based on a time-frequency graph sometimes referred to as a spectrogram. The video content classification system 66 then attempts to match the fingerprint(s) against millions of such fingerprints maintained in a database (not illustrated). In some embodiments, the video content classification system 66 may comprise a machine learning algorithm, such as a neural network, that has been trained to classify and identify video contents. In some embodiments, the video content being viewed by the user 14 may be being provided by the service provider that operates the computing device 18. In such embodiments, the video content classification system 66 may simply access service provider data that identifies the channel to which the TV is currently tuned, and determines the classification of the video content being played on such channel.

FIGS. 2A-2D are perspective views illustrating the overlaying of themed imagery onto real-world objects in the HMDD 16 according to one embodiment. FIGS. 2A-2D will be discussed in conjunction with FIG. 1. In this example, the user space 12 is a family room of the user 14. The user 14 is watching a TV 68 mounted on a wall 70 of the user space 12 via the HMDD 16. The HMDD 16 has a FOV 72, and thus the user 14 views, via the HMDD 16, what is presented to the user 14 within the FOV 72. In particular, a portion of the FOV 72 is used to present the streaming video content from the TV 68, and a portion 74 surrounding the TV 68 encompasses two additional objects, a portion of the wall 70, and a portion of a picture 76.

Initially, the HMDD 16 may present in the portion 74 of the FOV 72 the actual real-world objects in the user space 12, or may present a black or darkened background. The user 14 requests themed imagery from the computing device 18. The request may be made via an input control on the HMDD 16, such as a button, a touch-sensitive surface, or via some other user input control. Alternatively, the user 14 may make the request via another device, such as a remote control, a computing device, or the like.

The computing device 18 may then request that the user 14 initiate a particular protocol, such as slowly scanning the user space 12 in a 360 degree circle using the HMDD 16. As the user 14 slowly rotates their head about the entire user space 12, the depth camera 24 generates the depth data 55 that identifies distances from the HMDD 16 to surfaces of objects in the user space 12. In some embodiments, the RGB camera 30 may also generate a video stream of the user space 12. The depth data, and optionally, the video stream, is provided to the computing device 18. The computing device 18 receives the depth data 55 and generates the spatial map 56. The spatial map 56 comprises thousands of pixels with each pixel corresponding to a particular location in the user space 12, and identifying a distance between the HMDD 16 and the particular location. The computing device 18 utilizes the object classification system 58 to analyze the spatial map 56 and generate the object model 60. The object classification system 58 may also utilize the video stream received from the HMDD 16 to aid in classifying and identifying the objects in the user space 12.

The object classification system 58 generates object information 62 for each object classified and identified in the user space 12. In this example, the object classification system 58 identifies 9 objects in the user space 12, and generates a corresponding object information 62 for each such object. In particular, the object classification system 58 identifies the wall 70 as an object and generates object information 62-1 to correspond to the wall 70; identifies a wall 78 as an object and generates object information 62-2 to correspond to the wall 78; identifies a wall 80 as an object and generates object information 62-3 to correspond to the wall 80; identifies a floor 82 as an object and generates object information 62-4 to correspond to the floor 82; identifies the TV 68 as an object and generates object information 62-5 to correspond to the TV 68; identifies a table 84 as an object and generates object information 62-6 to correspond to the table 84; identifies a picture 86 as an object and generates object information 62-7 to correspond to the picture 86; identifies the picture 76 as an object and generates object information 62-8 to correspond to the picture 76; and identifies a couch 88 as an object and generates object information 62-9 to correspond to the couch 88. Each object information 62 identifies the location of the corresponding object and geometric data, such as a mesh, that defines the structure of the corresponding object.

The computing device 18 may then request a portion, such as a predetermined amount of time, such as 10 seconds, of the video content being streamed from the TV 68. The HMDD 16 utilizes the RGB camera 30 to capture the portion of the video content and sends the portion of the video content to the computing device 18. The controller module 38 utilizes the video content classification system 66 to classify the video content, which in this example is a baseball game between the Reds and the White Sox. The controller module 38 accesses the user profile 40-1, which is associated with the user 14, and determines, based on the user profile 40-1, that the favorite baseball team of the user 14 is the Reds. The controller module 38 analyzes the metadata 48 of the image themes 42 and determines, based on the classification of the video content as being a baseball game, and the user profile 40-1 that identifies the Reds as the favorite baseball team of the user 14, that three image themes 42 may be appropriate.

Figure 2A:
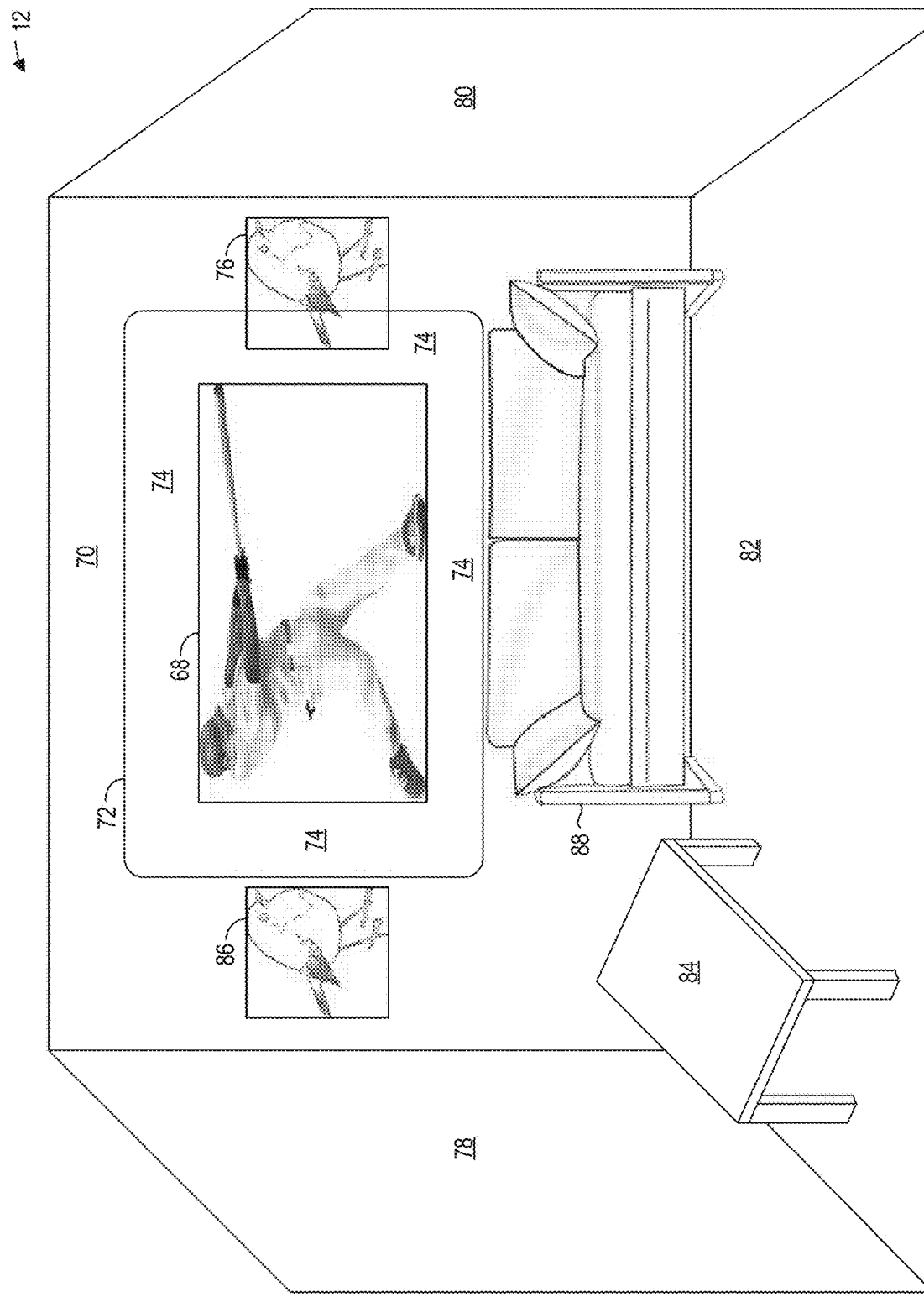
FIGS. 2A-2D are perspective views illustrating the overlaying of themed imagery onto real-world objects in the HMDD according to one embodiment.
Figure 2B:
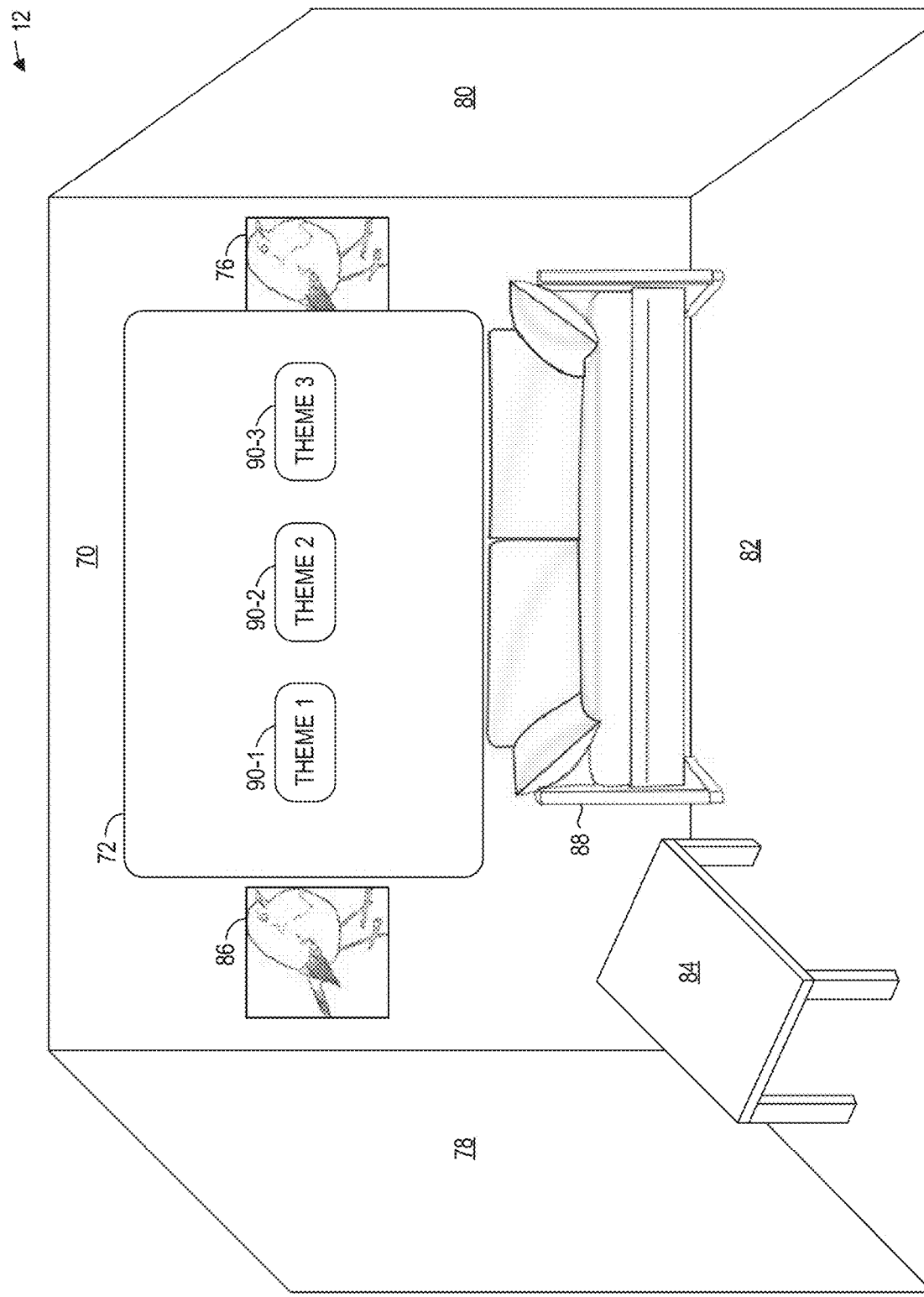

Referring now to FIG. 2B, the computing device 18 generates image theme identifiers 90-1-90-3, each image theme identifier 90-1-90-3 corresponding to one of the image themes 42 that may be appropriate. Each image theme identifier 90-1-90-3 may comprise imagery, text, or text and imagery describing the corresponding image theme 42. The user 14 selects the image theme identifier 90-1, which, in this example, corresponds to the image theme 42-1 and is a Reds-oriented baseball theme.

The computing device 18 receives the selected image theme identifier 90-1, and selects the image theme 42-1. Note that in some embodiments, the computing device 18 may not provide choices to the user 14 and may simply select an image theme 42 based on the classification of the video content and the metadata 48, or the classification of the video content, the user profile 40-1, and the metadata 48. The controller module 38 may select a different image texture 46 for each different object identified in the object information 62, or may use a lesser number of image textures 46 than the number of objects.

The controller module 38 may then generate the plurality of UV maps 64, each of which maps a particular image texture 46 of the image theme 42-1 onto a corresponding object identified in the object model 60. The controller module 38 then sends the UV maps 64, image textures 46, and object information 62-1-62-9 to the HMDD 16.

Figure 2C:
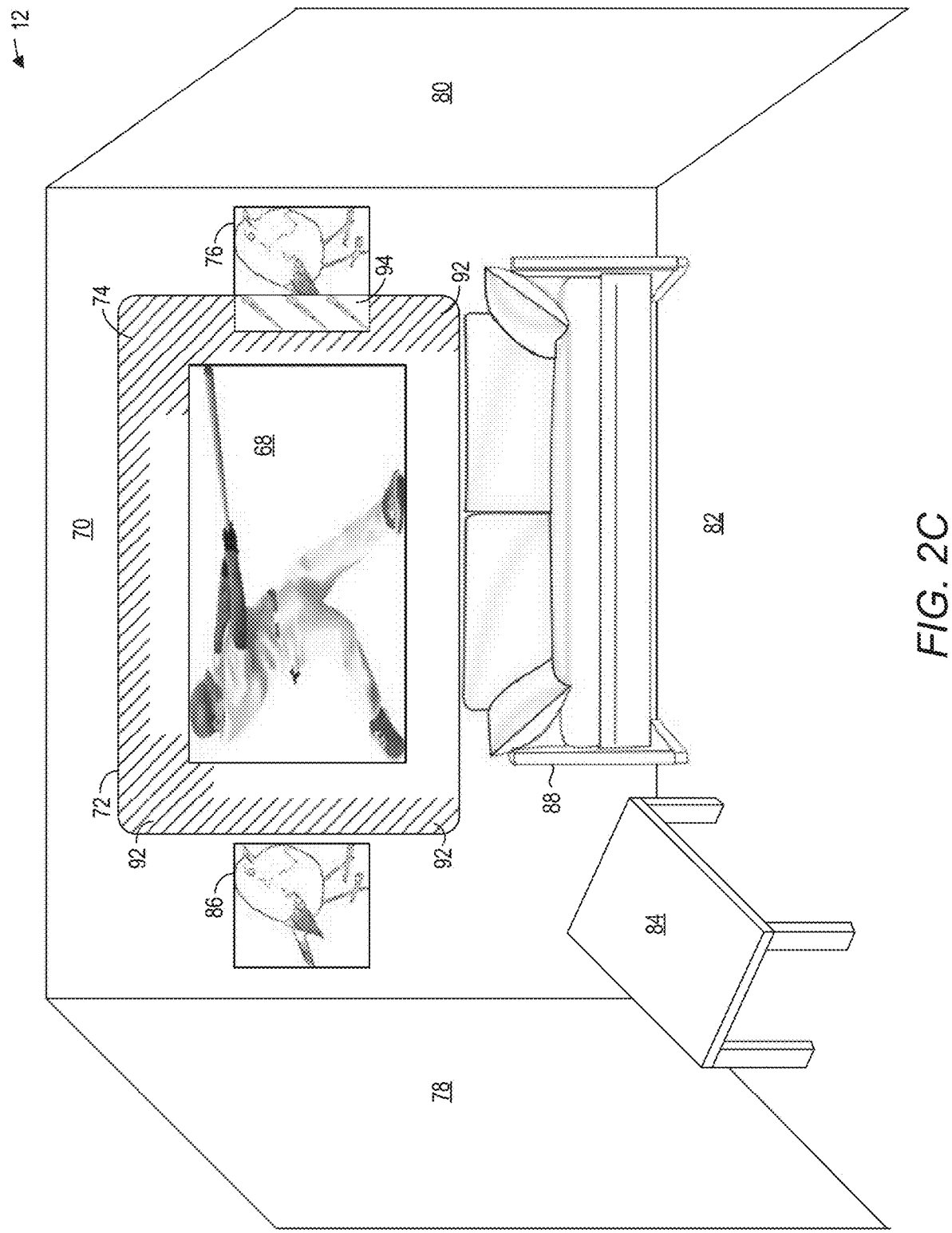

Referring now to FIG. 2C, the HMDD 16 receives the UV maps 64, image textures 46, and object information 62-1-62-9. The HMDD 16 determines, based on the object information 62-1-62-9, which objects or parts of objects are currently within the portion 74 of the FOV 72 of the HMDD 16, but are not blocked by the streaming video content from the TV 68. The HMDD 16 determines that a portion of the picture 76 and the wall 70 are within the portion 74. The HMDD 16 uses the object information 62-1, the corresponding image texture 46, and the UV map 64 corresponding to the wall 70 to generate imagery 92 that overlays the portion of the wall 70 that is within the portion 74 of the FOV 72, as illustrated in FIG. 2C by cross-hatching. The imagery 92 may comprise a color, such as red, or images of the Reds' baseball stadium, or imagery of the city of Cincinnati, or the like. The HMDD 16 also uses the object information 62-8, the corresponding image texture 46, and the UV map 64 corresponding to the picture 76 to generate imagery 94 that overlays the portion of the picture 76 that is within the portion 74 of the FOV 72, as illustrated in FIG. 2C by baseball bat images.

Figure 2D:
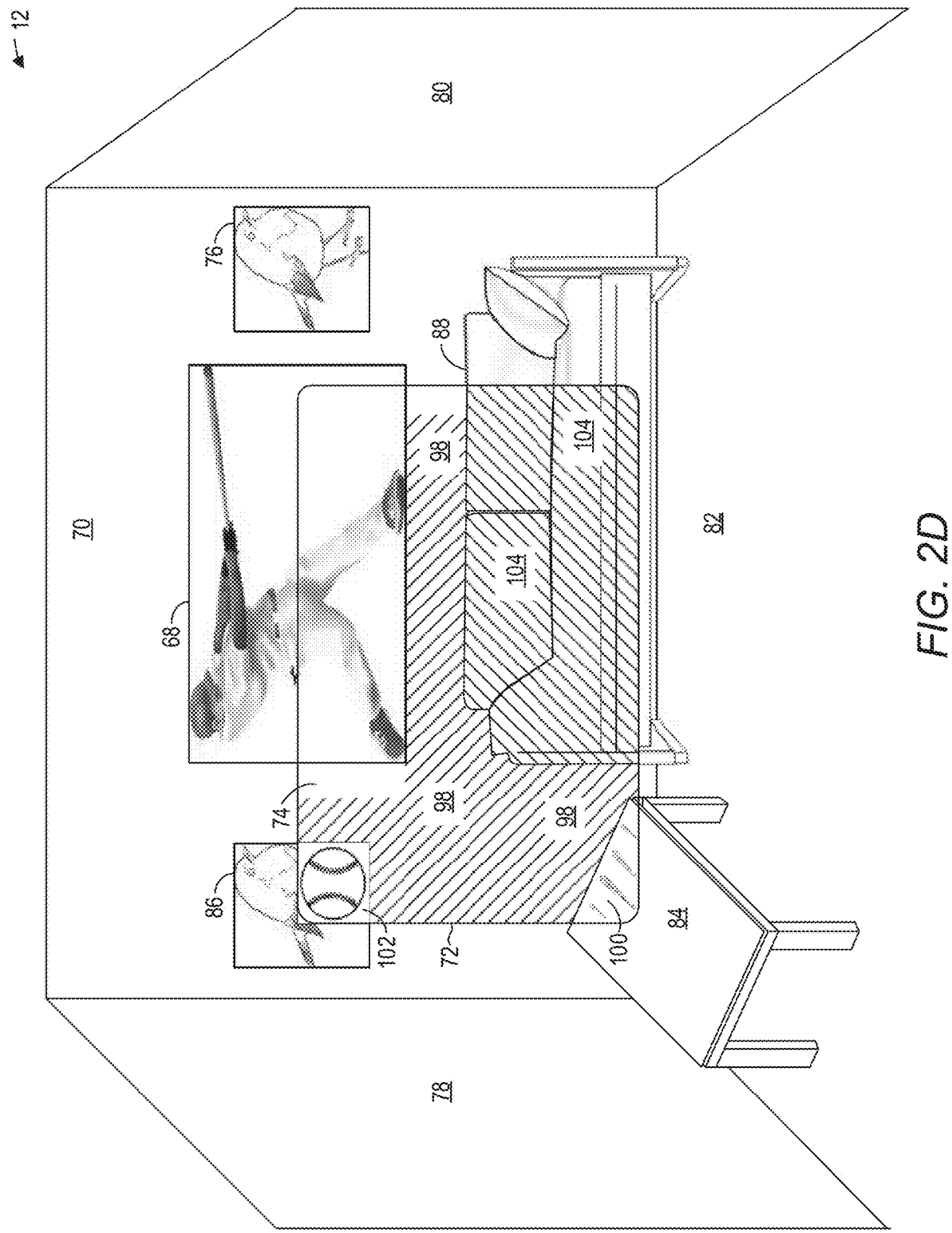

Referring now to FIG. 2D, the user 14 moves their head such that the FOV 72 now encompasses a different portion of the user space 12 than previously. The FOV 72 now encompasses a portion of the TV 68, but also encompasses a portion of the couch 88, a portion of the picture 86, a portion of the table 84, and a different portion of the wall 70 than before. Concurrently with the movement of the FOV 72, the HMDD 16 periodically, such as 30 or 60 times a second (or at any other desired periodic basis), determines what objects are within the FOV 72 and generates imagery to overlay each object within the FOV 72 other than the TV 68. In this example, the HMDD 16 uses the object information 62-1, the corresponding image texture 46, and the UV map 64 corresponding to the wall 70 to generate imagery 98 that overlays the portion of the wall 70 that is within the portion 74 of the FOV 72, as illustrated in FIG. 2D by cross-hatching. The HMDD 16 uses the object information 62-6, the corresponding image texture 46 and the UV map 64 corresponding to the table 84 to generate imagery 100 that overlays the portion of the table 84 that is within the portion 74 of the FOV 72, as illustrated in FIG. 2D by baseball bat imagery. The HMDD 16 uses the object information 62-7, the corresponding image texture 46 and the UV map 64 corresponding to the picture 86 to generate imagery 102 that overlays the portion of the picture 86 that is within the portion 74 of the FOV 72, as illustrated in FIG. 2D by baseball imagery. The HMDD 16 uses the object information 62-9, the corresponding image texture 46 and the UV map 64 corresponding to the couch 88 to generate imagery 104 that overlays the portion of the couch 88 that is within the portion 74 of the FOV 72, as illustrated in FIG. 2D by cross-hatching.

In this manner, as the user 14 looks about the user space 12, the user 14 is presented with themed imagery relating to the Cincinnati Reds while watching the Cincinnati Reds on the TV 68. Note that the themed imagery corresponds precisely to the location and shape of the objects in the room, such as the table 84 and the couch 88, allowing the user 14 to safely move about the user space 12 while watching the TV 68 via the HMDD 16.

Figure 3A:
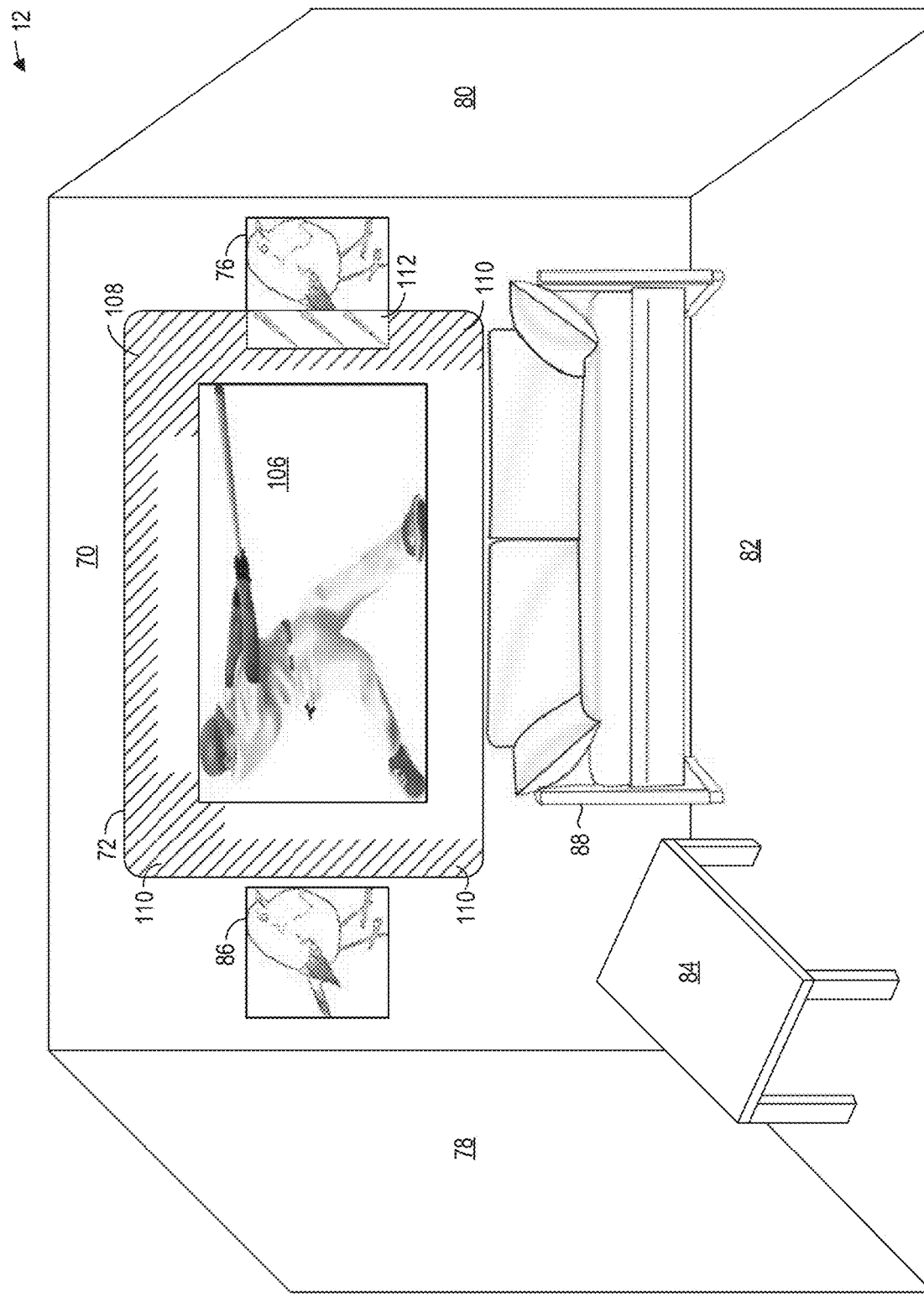
FIGS. 3A-3B are perspective views illustrating the overlaying of themed imagery onto real-world objects in the HMDD according to another embodiment.
Figure 3B:
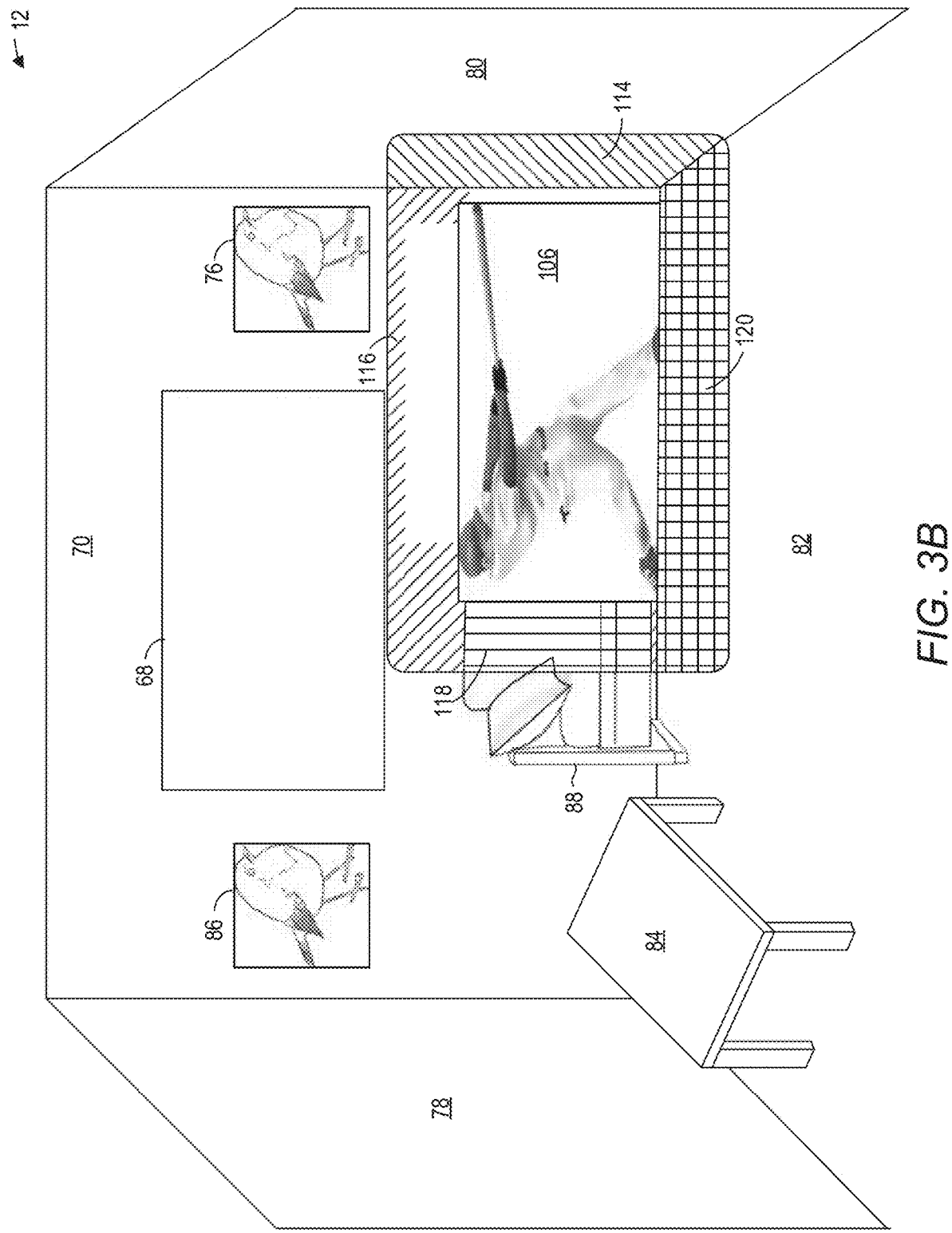

FIGS. 3A-3B are perspective views illustrating the overlaying of themed imagery onto real-world objects in the HMDD 16 according to another embodiment. FIGS. 3A-3B will be discussed in conjunction with FIG. 1. In this example, rather than watch streaming video content on the TV 68, the user 14 interacts with the computing device 18 to receive streaming video content that is presented in an area 106 within the FOV 72 of the HMDD 16. Note that a portion 108 of the FOV 72 is not utilized to view the streaming video content. The streaming video content is a Cincinnati Reds baseball game. As discussed above with regard to FIGS. 2A-2D, the computing device 18 may request that the user 14 initiate a particular protocol, such as slowly scanning the user space 12 in a 360 degree circle using the HMDD 16. The computing device 18 receives the depth data 55 and generates the spatial map 56. The computing device 18 utilizes the object classification system 58 to analyze the spatial map 56 and generate the object model 60. The object classification system 58 may also utilize the video stream received from the HMDD 16 to aid in classifying and identifying the objects in the user space 12. The object classification system 58 generates the object information 62 for each object classified and identified in the user space 12 as described above.

The controller module 38 then accesses metadata 52 associated with the streaming video content to classify the streaming video content as a Reds baseball game. The controller module 38 accesses the user profile 40-1, which is associated with the user 14, and determines, based on the user profile 40-1, that the Reds is the favorite baseball team of the user 14. The controller module 38 analyzes the metadata 48 of the image themes 42, and selects, based on the classification of the video content as being a baseball game and the user profile 40-1 that identifies the Reds as the favorite baseball team of the user 14, the image theme 40-1.

The controller module 38 generates the plurality of UV maps 64, each of which maps a particular image texture 46 of the image theme 42-1 onto a corresponding object identified in the object model 60. The controller module 38 then sends the UV maps 64, the image textures 46, and the object information 62-1-62-9 to the HMDD 16.

The HMDD 16 receives the UV maps 64, the image textures 46, and the object information 62-1-62-9. The HMDD 16 determines, based on the object information 62-1-62-9, which objects or parts of objects are currently within the portion 108 of the FOV 72 of the HMDD 16, but are not blocked by the streaming video content being presented in the area 106. The HMDD 16 determines that a portion of the picture 76 and the wall 70 are within the portion 108. The HMDD 16 uses the object information 62-1, the corresponding image texture 46, and the UV map 64 corresponding to the wall 70 to generate imagery 110 that overlays the portion of the wall 70 that is within the portion 108 of the FOV 72, as illustrated in FIG. 3A by cross-hatching. The imagery 110 may comprise a color, such as red, or images of the Reds' baseball stadium, or imagery of the city of Cincinnati, or the like. The HMDD 16 also uses the object information 62-8, the corresponding image texture 46, and the UV map 64 corresponding to the picture 76 to generate imagery 112 that overlays the portion of the picture 76 that is within the portion 108 of the FOV 72, as illustrated in FIG. 3A by baseball bat images.

Referring now to FIG. 3B, the user 14 moves their head such that the FOV 72 now encompasses a different portion of the user space 12 than previously. The FOV 72 now encompasses a portion of the wall 80, a portion of the floor 82, a portion of the wall 70, and a portion of the couch 88. Note that the streaming video content moves with the movement of the HMDD 16. As discussed above with regard to FIGS. 2A-2D, concurrently with the movement of the FOV 72, the HMDD 16 periodically, such as 30 or 60 times a second, determines what objects are within the FOV 72 and generates imagery to overlay each object within the FOV 72 other than those blocked by the area 106. In this example, the HMDD 16 overlays a portion 114 of the wall 80 with themed imagery, a portion 116 of the wall 70 with themed imagery, a portion 118 of the couch 88 with themed imagery, and a portion 120 of the floor 82 with themed imagery.

Figure 4:
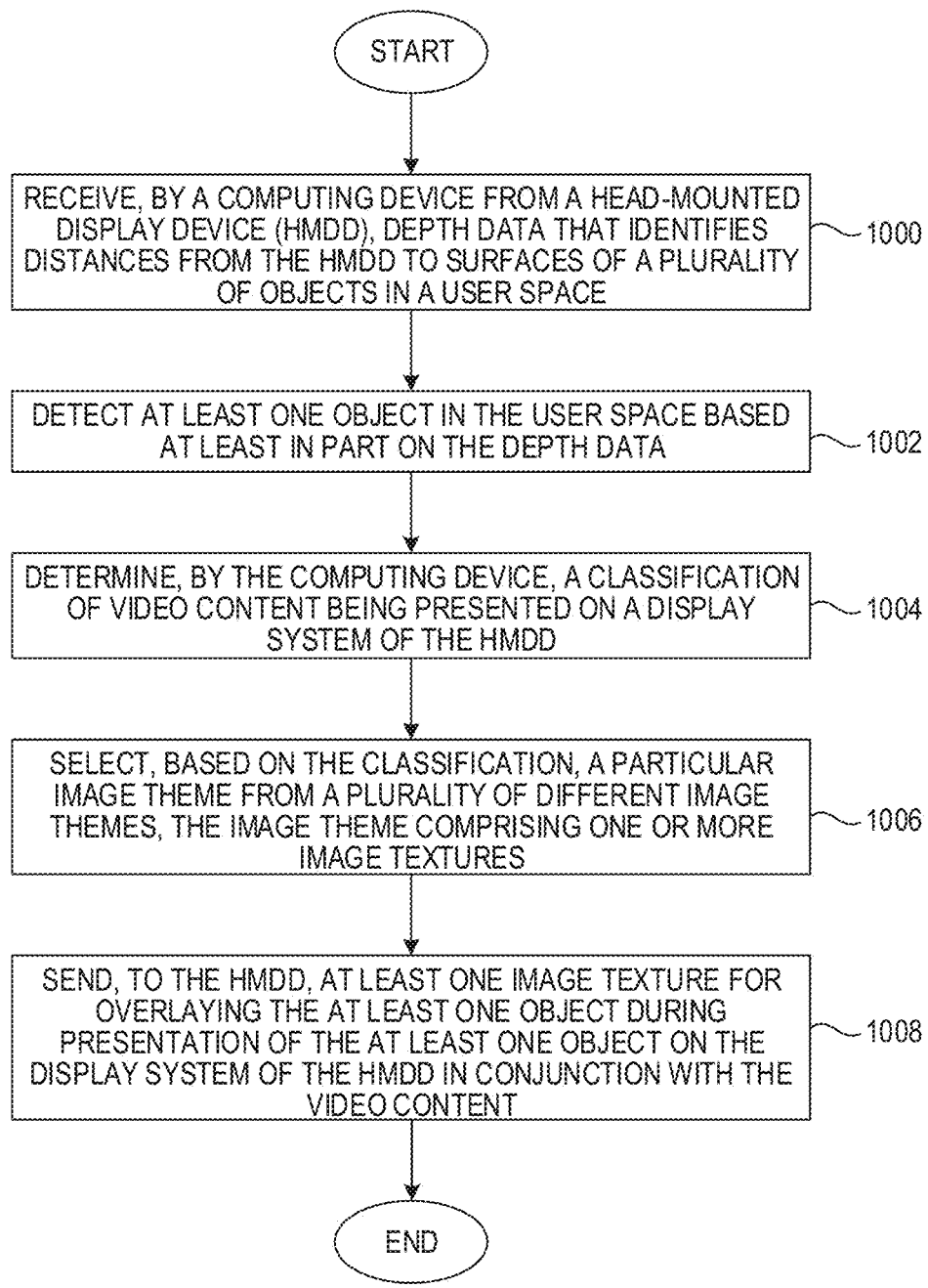
FIG. 4 is a flowchart of a method for overlaying themed imagery onto real-world objects in a head-mounted display device from the perspective of the computing device illustrated in FIG. 1 according to one embodiment.

FIG. 4 is a flowchart of a method for overlaying themed imagery onto real-world objects in an HMDD from the perspective of the computing device 18 according to one embodiment. FIG. 4 will be discussed in conjunction with FIG. 1. The computing device 18 receives, from the HMDD 16, the depth data 55 that identifies distances from the HMDD 16 to surfaces of a plurality of objects in the user space 12 (FIG. 4, block 1000). The computing device 18 detects at least one object in the user space 12 based at least in part on the depth data 55 (FIG. 4, block 1002). The computing device 18 determines a classification of video content being presented on the display system 26 of the HMDD 16 (FIG. 4, block 1004). The computing device 18 selects, based on the classification, a particular image theme 42 from the plurality of different image themes 42, the image theme 42 comprising one or more image textures 46 (FIG. 4, block 1006). The computing device 18 sends, to the HMDD 16, at least one image texture 46 for overlaying the at least one object during presentation of the at least one object on the display system 26 of the HMDD 16 in conjunction with the video content (FIG. 4, block 1008).

Figure 5:
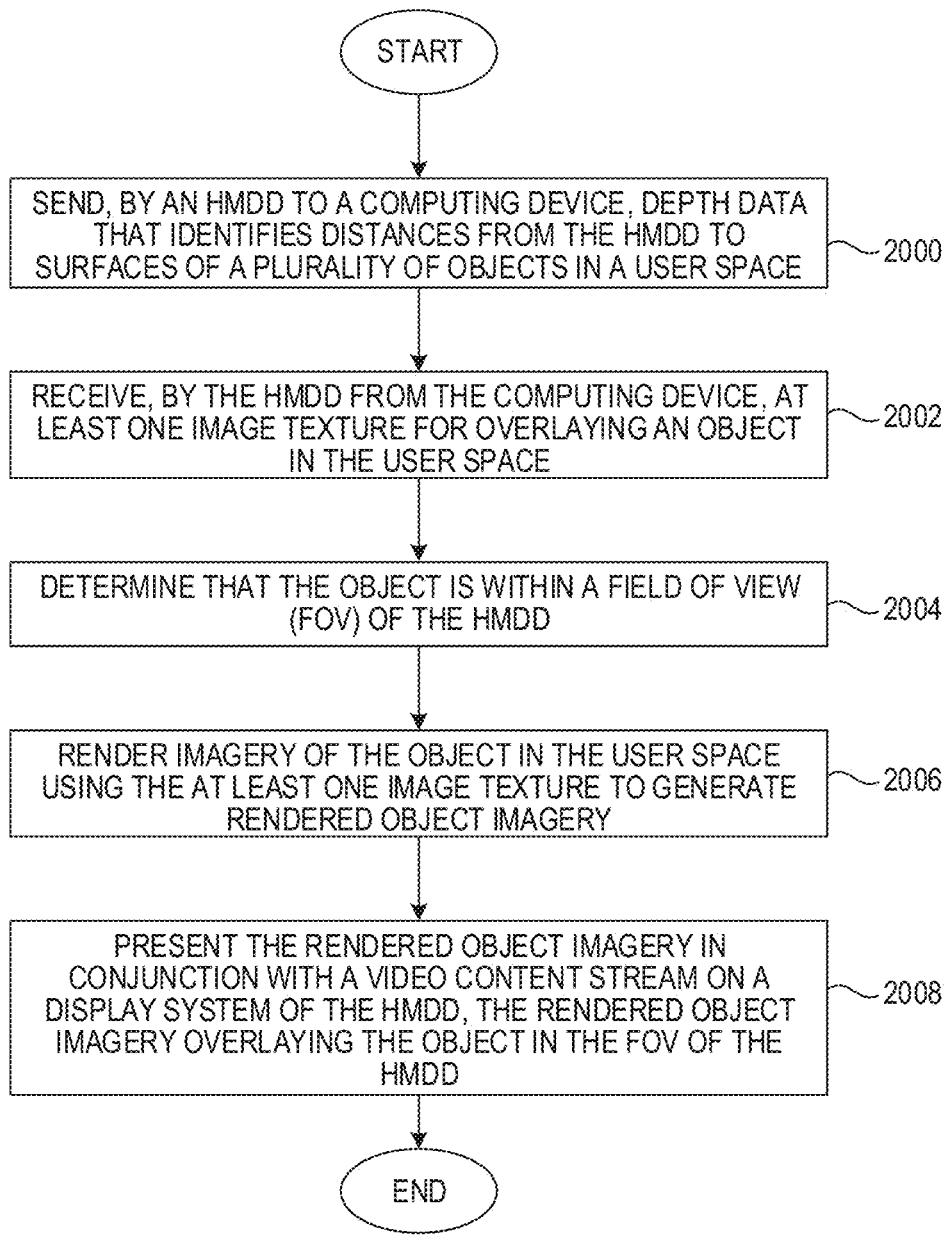
FIG. 5 is a flowchart of a method for overlaying themed imagery onto real-world objects in an HMDD from the perspective of the HMDD according to one embodiment.

FIG. 5 is a flowchart of a method for overlaying themed imagery onto real-world objects in an HMDD from the perspective of the HMDD 16 according to one embodiment. FIG. 5 will be discussed in conjunction with FIG. 1. The HMDD 16 sends, to the computing device 18, the depth data 55 that identifies distances from the HMDD 16 to surfaces of a plurality of objects in the user space 12 (FIG. 5, block 2000). The HMDD 16 receives, from the computing device 18, at least one image texture 46 for overlaying an object in the user space 12 (FIG. 5, block 2002). The HMDD 16 determines that the object is within the FOV 72 of the HMDD 16 (FIG. 5, block 2004). The HMDD 16 renders imagery of the object in the user space 12 using the at least one image texture 46 to generate rendered object imagery (FIG. 5, block 2006). The HMDD 16 presents the rendered object imagery in conjunction with a video content stream on the display system 26 of the HMDD 16, the rendered object imagery overlaying the object in the FOV 72 of the HMDD 16 (FIG. 5, block 2008).

Figure 6:
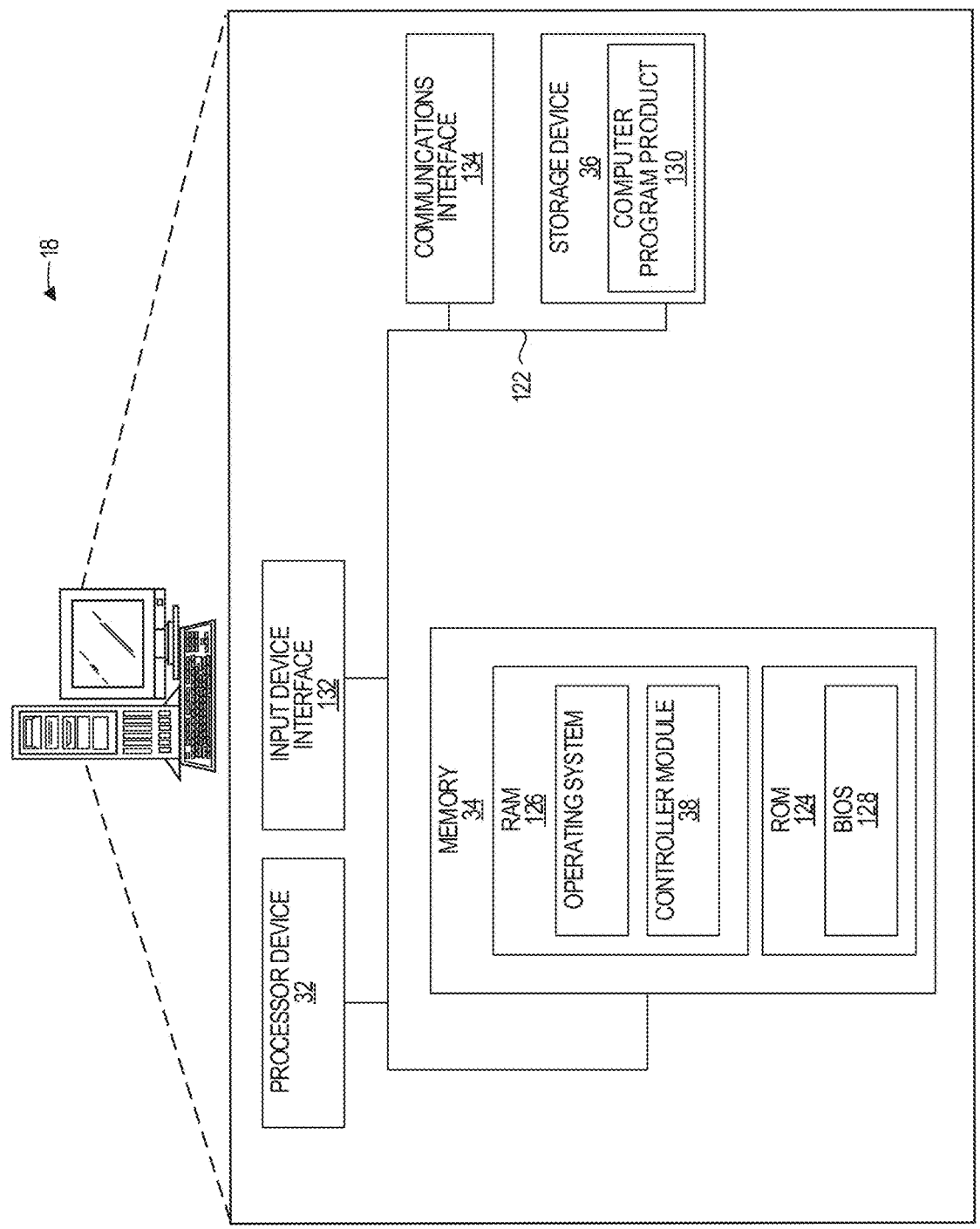
FIG. 6 is a block diagram of the computing device illustrated in FIG. 1 suitable for implementing examples according to one example.

FIG. 6 is a block diagram of the computing device 18 suitable for implementing examples according to one example. The computing device 18 may comprise any computing or electronic device capable of including firmware, hardware, and/or executing software instructions to implement the functionality described herein, such as a computer server or the like. The computing device 18 includes the processor device 32, the memory 34, and a system bus 122. The system bus 122 provides an interface for system components including, but not limited to, the memory 34 and the processor device 32. The processor device 32 can be any commercially available or proprietary processor device.

The system bus 122 may be any of several types of bus structures that may further interconnect to a memory bus (with or without a memory controller), a peripheral bus, and/or a local bus using any of a variety of commercially available bus architectures. The memory 34 may include non-volatile memory 124 (e.g., read-only memory (ROM), erasable programmable read-only memory (EPROM), electrically erasable programmable read-only memory (EEPROM), etc.), and volatile memory 126 (e.g., random-access memory (RAM)). A basic input/output system (BIOS) 128 may be stored in the non-volatile memory 124 and can include the basic routines that help to transfer information between elements within the computing device 18. The volatile memory 126 may also include a high-speed RAM, such as static RAM, for caching data.

The computing device 18 may further include or be coupled to a non-transitory computer-readable storage medium such as the storage device 36, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 36 and other drives associated with computer-readable media and computer-usable media may provide non-volatile storage of data, data structures, computer-executable instructions, and the like.

A number of modules can be stored in the storage device 36 and in the volatile memory 126, including an operating system and one or more program modules, such as the controller module 38, which may implement the functionality described herein in whole or in part. All or a portion of the examples may be implemented as a computer program product 130 stored on a transitory or non-transitory computer-usable or computer-readable storage medium, such as the storage device 36, which includes complex programming instructions, such as complex computer-readable program code, to cause the processor device 32 to carry out the steps described herein. Thus, the computer-readable program code can comprise software instructions for implementing the functionality of the examples described herein when executed on the processor device 32. The processor device 32, in conjunction with the controller module 38 in the volatile memory 126, may serve as a controller, or control system, for the computing device 18 that is to implement the functionality described herein.

An operator may also be able to enter one or more configuration commands through a keyboard, a pointing device such as a mouse (not illustrated), or a touch-sensitive surface such as a display device. Such input devices may be connected to the computing device 18 through an input device interface 132 coupled to the system bus 122 but can be connected through other interfaces such as a parallel port, an Institute of Electrical and Electronic Engineers (IEEE) 1394 serial port, a Universal Serial Bus (USB) port, an IR interface, and the like.

The computing device 18 may also include a communications interface 134 suitable for communicating with the network 29 as appropriate or desired.

Figure 7:
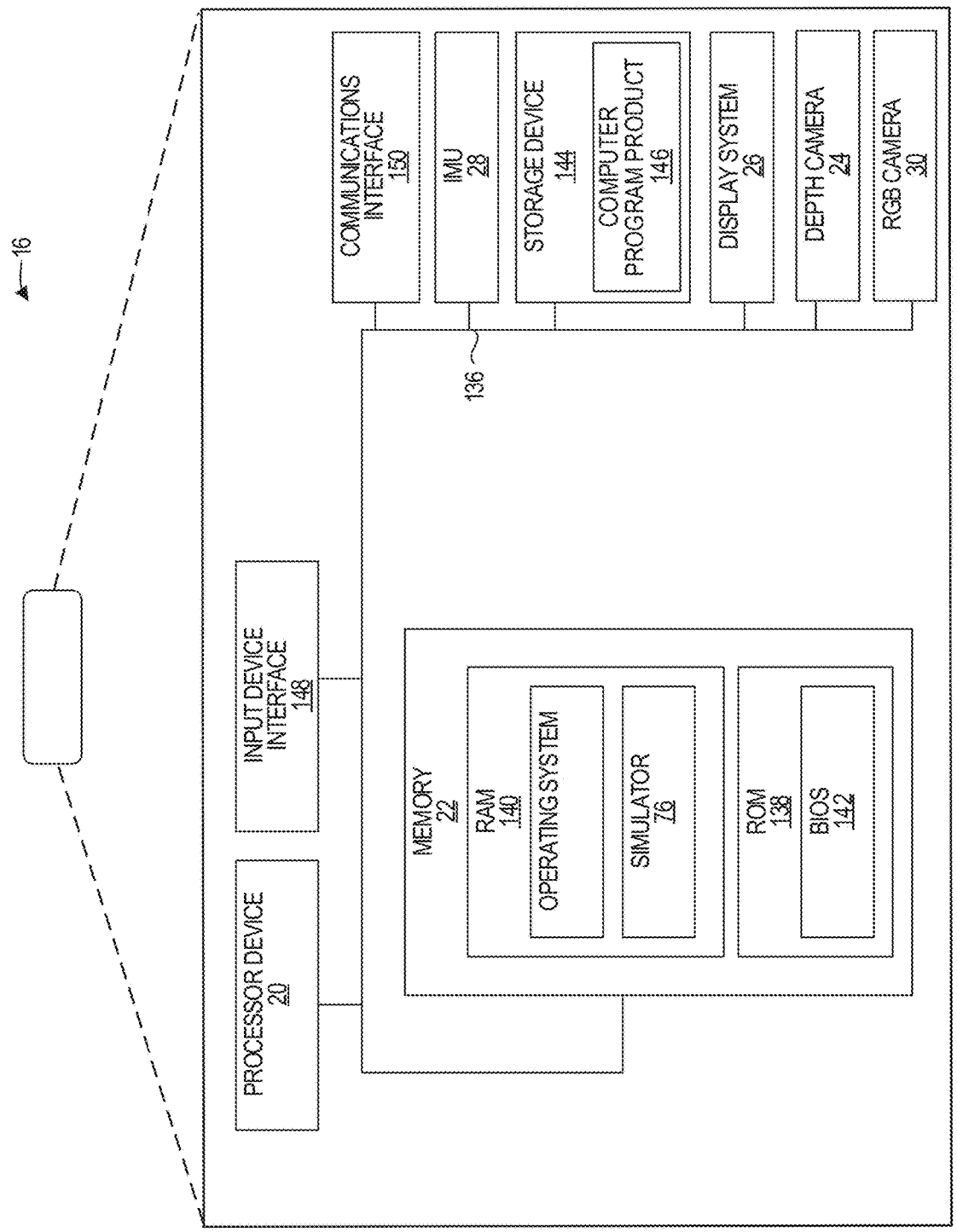
FIG. 7 is a block diagram of the HMDD illustrated in FIG. 1 suitable for implementing embodiments disclosed herein.

FIG. 7 is a block diagram of the HMDD 16 according to one embodiment. The HMDD 16 includes the processor device 20, the memory 22, and a system bus 136. The system bus 136 provides an interface for system components including, but not limited to, the memory 22 and the processor device 20. The processor device 20 can be any commercially available or proprietary processor device.

The system bus 136 may be any of several types of bus structures that may further interconnect to a memory bus (with or without a memory controller), a peripheral bus, and/or a local bus using any of a variety of commercially available bus architectures. The memory 22 may include non-volatile memory 138 (e.g., read-only memory (ROM), erasable programmable read-only memory (EPROM), electrically erasable programmable read-only memory (EEPROM), etc.), and volatile memory 140 (e.g., random-access memory (RAM)). A basic input/output system (BIOS) 142 may be stored in the non-volatile memory 138 and can include the basic routines that help to transfer information between elements within the HMDD 16. The volatile memory 140 may also include a high-speed RAM, such as static RAM, for caching data.

The HMDD 16 may further include a non-transitory computer-readable storage medium such as a storage device 144, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 144 and other drives associated with computer-readable media and computer-usable media may provide non-volatile storage of data, data structures, computer-executable instructions, and the like.

A number of modules can be stored in the storage device 144 and in the volatile memory 140, including an operating system and one or more program modules, which may implement the functionality described herein in whole or in part. All or a portion of the examples may be implemented as a computer program product 146 stored on a transitory or non-transitory computer-usable or computer-readable storage medium, such as the storage device 144, which includes complex programming instructions, such as complex computer-readable program code, to cause the processor device 20 to carry out the steps described herein. Thus, the computer-readable program code can comprise software instructions for implementing the functionality of the examples described herein when executed on the processor device 20.

An operator may also be able to enter one or more configuration commands through buttons or other input controls integrated into the HMDD 16, or via an external interface controlled by an external interface such as a keyboard (not illustrated) or a pointing device such as a mouse. Such input devices may be connected to the processor device 20 through an input device interface 148.

The HMDD 16 may also include a communications interface 150 suitable for communicating with the network 29 as appropriate or desired. The HMDD 16 includes the IMU 28, the display system 26, the depth camera 24, and the RGB camera 30.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
receiving, by a computing device from a head-mounted display device (HMDD), depth data that identifies distances from the HMDD to surfaces of a plurality of objects in a user space;
detecting at least one object in the user space based at least in part on the depth data;
determining, by the computing device, a classification of video content being presented on a display system of the HMDD, the classification being based on subject matter depicted in the video content;
automatically selecting, by the computing device based on the classification, a particular image theme from a plurality of different image themes, the image theme comprising one or more image textures; and
sending, to the HMDD, at least one image texture for overlaying the at least one object during presentation of the at least one object on the display system of the HMDD concurrent with and adjacent to the video content.

2. The method of claim 1 further comprising:
generating, based on the depth data, a spatial map;
identifying, by the computing device, the plurality of objects, including the at least one object, in the user space based on the spatial map; and
wherein sending the at least one image texture to the HMDD further comprises sending, for each of the plurality of objects, a different image texture to the HMDD.

3. The method of claim 1 further comprising:
generating, based on the depth data, a spatial map;
identifying, by the computing device, the plurality of objects, including the at least one object, in the user space based on the spatial map; and
generating object information for each of the plurality of objects, each object information identifying a location of a corresponding object in the user space.

4. The method of claim 1 further comprising:
generating, based on the depth data, a spatial map;
identifying, by the computing device, the plurality of objects, including the at least one object, in the user space based on the spatial map;
generating object information for each of the plurality of objects, each object information identifying a location of a corresponding object of the plurality of objects and geometric data that defines a structure of the corresponding object;
selecting, from the one or more image textures, a corresponding particular image texture for each of the plurality of objects; and
sending, to the HMDD, the object information for each of the plurality of objects and the corresponding particular image texture for each of the plurality of objects.

5. The method of claim 1 further comprising:
generating, based on the depth data, a spatial map;

identifying, by the computing device, the plurality of objects, including the at least one object, in the user space based on the spatial map;

generating object information for each of the plurality of objects, each object information identifying a location of a corresponding object of the plurality of objects and geometric data that defines a structure of the corresponding object;

selecting, from the one or more image textures, a corresponding particular image texture for each of the plurality of objects;

generating, for each object of the plurality of objects, a UV map that maps the corresponding particular image texture onto the corresponding object; and sending, to the HMDD, the UV map, the object information, and the corresponding particular image texture for each of the plurality of objects.

6. The method of claim 1 further comprising:

streaming, by the computing device, the video content to the HMDD; and wherein determining the classification of the video content being presented on the display system of the HMDD comprises accessing metadata associated with the video content that identifies the video content.

7. The method of claim 1 wherein determining the classification of the video content being presented on the display system of the HMDD comprises:

receiving, by the computing device from the HMDD, a portion of the video content; and determining, by the computing device, the classification of the video content based on the portion of the video content.

8. The method of claim 1 wherein selecting, based on the classification, the particular image theme further comprises:

accessing user profile information associated with a user of the HMDD; and selecting the particular image theme based on the classification and the user profile information.

9. The method of claim 1 wherein the at least one object comprises a wall.

10. The method of claim 1 wherein the at least one object comprises a piece of furniture.

11. A computing device, comprising:

a memory; and a processor device coupled to the memory configured to:

receive, from a head-mounted display device (HMDD), depth data that identifies distances from the HMDD to surfaces of a plurality of objects in a user space;

detect at least one object in the user space based at least in part on the depth data;

determine a classification of video content being presented on a display system of the HMDD, the classification being based on subject matter depicted in the video content;

automatically select, based on the classification, a particular image theme from a plurality of different image themes, the image theme comprising one or more image textures; and send, to the HMDD, at least one image texture for overlaying the at least one object during presentation of the at least one object on the display system of the HMDD concurrent with and adjacent to the video content.

12. The computing device of claim 11, wherein the processor device is further configured to:

generate, based on the depth data, a spatial map;

identify the plurality of objects, including the at least one object, in the user space based on the spatial map; and generate object information for each of the plurality of objects, each object information identifying a location of a corresponding object in the user space.

13. The computing device of claim 11, wherein the processor device is further configured to:

generate, based on the depth data, a spatial map;

identify, by the computing device, the plurality of objects including the at least one object in the user space based on the spatial map;

generate object information for each of the plurality of objects, each object information identifying a location of a corresponding object of the plurality of objects and geometric data that defines a structure of the corresponding object;

select, from the one or more image textures, a corresponding particular image texture for each of the plurality of objects; and send, to the HMDD, the object information for each of the plurality of objects and the corresponding particular image texture for each of the plurality of objects.

14. The computing device of claim 11 wherein to determine the classification of the video content being presented on the display system of the HMDD, the processor device is further configured to:

receive, from the HMDD, a portion of the video content; and determine the classification of the video content based on the portion of the video content.

15. A computer program product stored on a non-transitory computer-readable storage medium and including instructions configured to cause a processor device to:

receive, from a head-mounted display device (HMDD), depth data that identifies distances from the HMDD to surfaces of a plurality of objects in a user space;

detect at least one object in the user space based at least in part on the depth data;

determine a classification of video content being presented on a display system of the HMDD, the classification being based on subject matter depicted in the video content;

automatically select, based on the classification, a particular image theme from a plurality of different image themes, the image theme comprising one or more image textures; and send, to the HMDD, at least one image texture for overlaying the at least one object during presentation of the at least one object on the display system of the HMDD concurrent with and adjacent to the video content.

16. The computer program product of claim 15, wherein the instructions further cause the processor device to:

generate, based on the depth data, a spatial map;

identify the plurality of objects, including the at least one object, in the user space based on the spatial map; and generate object information for each of the plurality of objects, each object information identifying a location of a corresponding object in the user space.

17. The computer program product of claim 15, wherein the instructions further cause the processor device to:

generate, based on the depth data, a spatial map;

identify, by the computing device, the plurality of objects including the at least one object in the user space based on the spatial map;

generate object information for each of the plurality of objects, each object information identifying a location of a corresponding object of the plurality of objects and geometric data that defines a structure of the corresponding object;

select, from the one or more image textures, a corresponding particular image texture for each of the plurality of objects; and send, to the HMDD, the object information for each of the plurality of objects and the corresponding particular image texture for each of the plurality of objects.

18. The computer program product of claim 15 wherein to determine the classification of the video content being presented on the display system of the HMDD, the instructions further cause the processor device to:

receive, from the HMDD, a portion of the video content; and determine the classification of the video content based on the portion of the video content.

\* \* \* \* \*